(12) United States Patent
McIntyre

(10) Patent No.: US 9,693,545 B1
(45) Date of Patent: Jul. 4, 2017

(54) ELECTRIC AC OR DC FISHING LINE DRYER, CLEANER, LINE CONDITIONER AND SPOOLER WITH LINE COUNTER

(71) Applicant: Walter Blaine McIntyre, Sunnyvale, CA (US)

(72) Inventor: Walter Blaine McIntyre, Sunnyvale, CA (US)

( * ) Notice: Subject to any disclaimer, the term of this patent is extended or adjusted under 35 U.S.C. 154(b) by 411 days.

(21) Appl. No.: 13/986,026

(22) Filed: Mar. 22, 2013

(51) Int. Cl.
*A01K 97/16* (2006.01)
*A01K 89/00* (2006.01)

(52) U.S. Cl.
CPC .......... *A01K 97/16* (2013.01); *A01K 89/003* (2013.01)

(58) Field of Classification Search
CPC .... A01K 89/003; A01K 89/017; A01K 87/00; A01K 97/016
See application file for complete search history.

(56) References Cited

U.S. PATENT DOCUMENTS

| | | | | | |
|---|---|---|---|---|---|
| 1,611,625 | A | * | 12/1926 | Witscher | A01K 97/16 242/404.2 |
| 1,976,242 | A | * | 10/1934 | McGee | A01K 97/16 188/83 |
| 2,001,570 | A | * | 5/1935 | Fenton | A01K 97/16 242/396.9 |
| 2,007,050 | A | * | 7/1935 | Hirschmann | A01K 97/16 242/375.1 |
| 2,040,567 | A | * | 5/1936 | Rowe | A01K 97/16 134/122 R |
| 2,041,249 | A | * | 5/1936 | Johnson | A01K 97/16 242/401 |
| 2,141,579 | A | * | 12/1938 | White | A01K 97/16 242/404.2 |
| 2,214,661 | A | * | 9/1940 | Darling | A01K 97/16 242/401 |
| 2,281,868 | A | * | 5/1942 | Stuppy | B65H 75/406 242/388.6 |
| 2,282,147 | A | * | 5/1942 | Quentin | A01K 97/16 242/401 |
| 2,563,045 | A | * | 8/1951 | Kelly | A01K 97/16 242/407.1 |
| 2,592,143 | A | * | 4/1952 | Holtz | A01K 97/16 242/375.1 |
| 2,643,660 | A | * | 6/1953 | Buchholz | A01K 97/16 134/112 |
| 2,903,196 | A | * | 9/1959 | Fowler | A01K 89/003 242/388.7 |
| 3,082,972 | A | * | 3/1963 | Di Francesco | A01K 97/16 242/127 |
| 4,191,340 | A | * | 3/1980 | Kubanek | B65H 63/08 242/223 |
| 4,344,587 | A | * | 8/1982 | Hildreth | A01K 89/017 192/216 |
| 5,535,538 | A | * | 7/1996 | Heuke | A01K 91/065 43/19.2 |

(Continued)

*Primary Examiner* — Michael Barr
*Assistant Examiner* — Benjamin L Osterhout

(57) ABSTRACT

This invention removes fishing line from any type of reel, cleans it, dries it, and then by reversing the process, treats the line, tensions it as it is counted and rewinds it back on the reel. The entire apparatus is portable using either direct or alternating current. All fishermen, world wide, would like this invention because it would keep his equipment clean, avoid worry or a guilt trip.

6 Claims, 4 Drawing Sheets

(56) References Cited

U.S. PATENT DOCUMENTS

| | | | | |
|---|---|---|---|---|
| 5,709,350 A | * | 1/1998 | Davis | A01K 89/003 242/390.8 |
| 6,260,785 B1 | * | 7/2001 | Prais | A01K 89/003 242/390.8 |
| 2004/0035973 A1 | * | 2/2004 | Henrion | A01K 89/003 242/390.8 |
| 2006/0086381 A1 | * | 4/2006 | Bardini | A01K 89/003 134/144 |
| 2006/0192044 A1 | * | 8/2006 | Lindgren | A01K 87/00 242/291 |
| 2009/0277070 A1 | * | 11/2009 | Lindgren | A01K 87/00 43/20 |

* cited by examiner

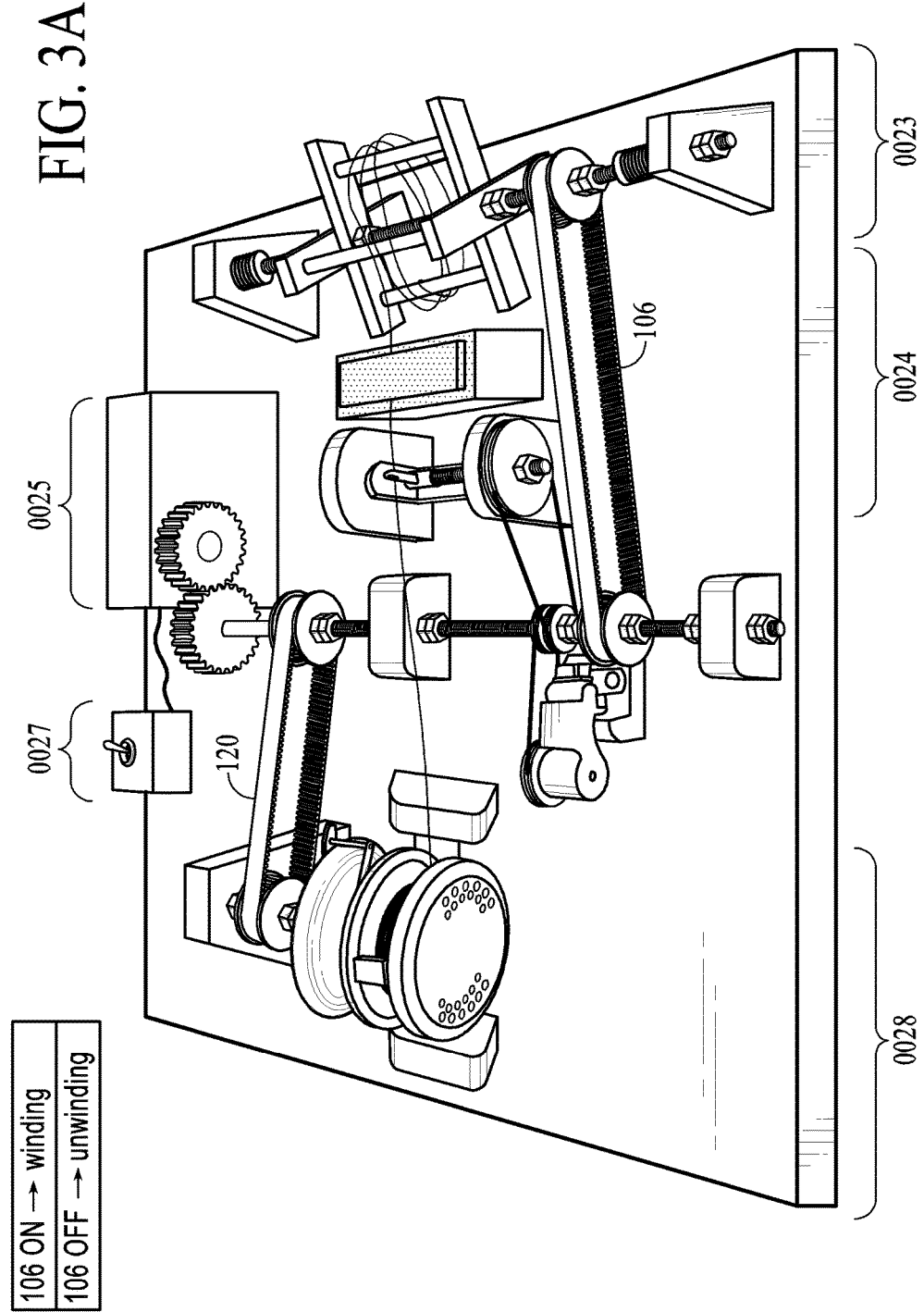

ELECTRIC AC OR DC FISHING LINE DRYER, CLEANER, LINE CONDITIONER AND SPOOLER WITH LINE COUNTER

Everything about fishing is positive. One readily accepts the challenge to catch fish, to be in the fresh air and beautiful surroundings. The only drudgery is cleaning the fish and cleaning the equipment. If one releases the fish the only drudgery is cleaning the equipment.

This invention includes a method of cleaning the fishing line and reel, drying it, conditioning the line, re-spooling it and measuring it.

This invention is portable and can be used with alternating current from a house or direct current from a battery.

BACKGROUND OF THE INVENTION

Excluding netting and trapping, there are two basic types of fishing: fly fishing and bait fishing. Both methods use a fishing line with a hook on one end and an attractor to lure fish to bite. The other end of the line is stored on a reel, can or stick.

A fishing pole facilitates the casting and retrieving process and clamps a storage facility (called a reel) on the operator's end.

ALL FISHERMEN from stream fishing with light tackle to deep sea fishing with heavy tackle face a dilemma, "How to keep the fishing line and reel clean."

Fishing rods are made to catch fish of different weights. Light rods and lines for small fish and heavy rods and lines for large fish. Salt water rods are made to resist corrosion more than fresh water rods.

If a fishing line is not cleaned after use it will not peel off the reel as easily as before. It is most notable following salt water use because the line sticks to itself on the reel. If it is not cleaned it will corrode the line and weaken it. The line may break on the next outing. Thus, salt water fishermen dunk their reels into a bucket of fresh water after use. The need to clean fishing line following fresh water fishing is most notable by fly fishermen. Algae and pollutants in the water coat the line. Thus, the line does not peel off the reel fast nor eject through the rod guides like it should. It noticeably inhibits the distance of each cast. Fishing lines are made of mostly petroleum-based products today. Although they were made of horsehair and various materials such as cotton, silk, wool and steel. Synthetic fibers such as polyester and plastic fibers are much superior to natural fibers.

Whatever material is used for a fishing line, it must be cleaned or it will become coated and fail in not being able to cast. Also deterioration of the line itself will continue until it cracks or breaks.

Until the recent invention, one's fishing line and reel are placed in a bucket of clean water overnight. The line is then removed from the reel, wiped clean and dried by winding it around various tree and other immovable objects at hand enough times to expose the entire line. The line would be tied off at some point to maintain its position for drying. Clean water and towel are sufficient to clean a fishing line. If soap or detergent is used it must be wiped with clean water.

As soon as the line has dried, a soft cloth with line dressing on it such as Russ Peaks line dressing by Umpona, is wiped on the line. The line dressing is an oil derivative and contains glycerin, which coats the line and makes it slick. The reel is then cleaned and oiled with a reel lube, such as Loon Outdoor Reel Lube.

Next the line is rewound around the reel being careful to space the line correctly on the reel by hand.

This entire process requires three to four hours for each line.

Prior fishing reel line loading machines or mechanisms lack various features and abilities. They are generally bulky, expensive and mainly in use by commercial markets, such as fishing stores, sports stores, outdoor equipment stores and the like. For instance, U.S. Pat. No. 6,457,665 describes a fly reel loader designed specifically only for a fly reel and works with a portable electric screwdriver or drill motor. (See also, U.S. Pat. No. 5,725,172, both of which are incorporated herein by reference for all purposes in their entirety). Though prior devices imply ease of use and ability to guide a line onto the reel in a uniform and evenly distributed manner for a low cost, they often require complicated manipulations and are only directed to a specific type of line or size of reel. There remains a need for a simple, quality reel loader which is flexible enough to be useful for multiple different reel sizes, and which cleans, conditions, loads and unloads fishing lines without the need to hang the line out to dry between such steps.

Previously, fishing enthusiasts were relegated to taking their used reels and lines to a professional fishing store, outdoor enthusiast store or sports store to have the line replaced or treated and reloaded which is often costly, time consuming and inconvenient.

The first patent search of U.S. Patents for Fishing Line Cleaning and Winding Systems on Sep. 1, 2009 yielded "No patents have matched your query."

A second query dated Nov. 2, 2010 yielded six answers. Each one is different and addressed separately.

U.S. Pat. No. 4,540,136, dated Sep. 10, 1985, Fishing Line Loader Apparatus. This apparatus was designed to remove fishing line from reels and place on a spool. The old practice was to store spools and when needed rewind the line on a reel.

My invention eliminates the spool, uses a motor to drive the unwinding, drying, cleaning, treating, rewinding and measuring the line.

U.S. Pat. No. 6,015,111, dated Jan. 18, 2000 Fishing Line Exchange, Structure and Method. Again this system is designed to remove line from a fishing reel and store it on a spool. This was an old method. Using a drill for power is an improvement but as illustrated it would not work. A frame would have to hold the drill, the rod and the spool. Again my invention eliminated the spool, uses an A/C motor which will not explode, to drive the unwinding, drying and cleaning, treating, rewinding and measuring the line.

U.S. Pat. No. 6,418,658, dated Jul. 16, 2002 Pole-Attached Fishing Line Cleaning Tool. This invention is fine if the line you wish to clean and or condition is on a spool or another reel. If the line on the pole was completely extended it could be cleaned while being reeled in. A very good idea but is very difficult to use. Again my invention eliminates the need to wind the line on another spool, or a tree 100 to 200 yards away or a friend extending the line. It uses a motor which will drive the unwinding, drying, cleaning, treating, rewinding and measuring of the line.

U.S. Pat. No. 7,568,650, dated Aug. 4, 2009 Level Wind Mechanism. This is a very sophisticated reeling system which would not apply to this invention.

U.S. Pat. No. 1,912,086, dated Apr. 3, 1931 Fishing Reel. This reel is in common use today. My invention would be used to remove the line from this casting reel using an electric motor, to drive the unwinding, drying, cleaning, treating, rewinding and measuring the line. The wind mechanism or line distributor would be purchased from a licensed dealer so as not to infringe on this patent. The inventor, Elton C. Mayhew will receive his royalty.

PATENT SUMMARY Each patent examined has a specific application. None connect the dots. All the deficiencies of the above patents are resolved by the present invention because it is quick, efficient and does many things at once: cleans, dries, treats the line, spools, rewinds and measures fishing lines. One can use it at home with a 120 volt line or plug it into an automobile cigarette lighter or a boat direct current 12 volts, using an inverter.

BRIEF SUMMARY OF THE INVENTION

The invention relates to fishing equipment. More particularly, the invention relates to systems and methods for loading and unloading (spooling and unspooling) fishing line onto one or more fishing reels. The systems and methods relate to both loading line and unloading line, i.e. alternatively referred to herein as spooling and unspooling, under proper tensioning, with the additional advantage of cleaning, conditioning and preparing the line as it loads or unloads onto the reel. The fishing reel may be any reel of any type or size, for instance for fly fishing, deep sea fishing or any one or more of generally known and commercially available general lightweight angling reels.

SUMMARY OF INVENTION

After fishing the reel is detached from the fishing pole it is attached to a similar rod holder (123) on the system board [0030]. The fishing line end is then threaded through a worm gear guidance system (111) which will disperse the fishing line right to left and left to right as it moves through the cleaning block and wraps on the drying cage when the power is turned on using a power switch (119), it energizes the motorized system via a belt (106) and two pulleys (105A, 105B).

The cleaning block (107) is covered on top with two layers of felt. Water saturates the felt and the line is cleaned and water removed as the line travels to and fro on its travel to the drying cage (109).

The fishing line is fastened to a spoke on the drying cage. Separating a wet fishing line to dry on the drying cage is key, otherwise one has a spool of soggy lines.

As the fishing line passes through the felt cleaning pads oscillating back and forth it is wiped clean. No person has had to touch the fishing line to guide it or clean it thus with no water on the fishing line and separated on the drying cage it dries in minutes.

The drying cage pulls the fishing line thru the cleaning process. The line drag on the fishing reel is tightened to provide tension so the cage will not over-spin and foul up the fishing line. The fishing line has been removed from the fishing reel.

Tension is released on the fishing line by releasing the drag on the fishing reel attached to the rod holder. New tension on the fishing line is done by tightening the spiral springs (103A) and (103B). Immobilize the pulley (105A) to the drying basket, then energize pulley (105C) in the reel section which is connected by belt (120) to the motor [0025]. Power is now reversed from the motor section by pulleys and a belt. A disk or spindle item (124), is attached to the handle of the fishing reel and height of the spindle is adjusted by blocks as required.

The fishing line is now passed through the cleaning block in reverse. This time the felt cleaners are coated with line cleaner and line preservatives. The worm gear guidance system (111) separates the line left to right and right to left. The fishing line is separated left to right and right to left exactly the way a fisherman would like the fishing line separated which prevents tangles and is properly tensioned.

A fishing line counter (117) registers the length of the line being wrapped on a reel by attaching it to a small pulley that is attached to the worm gear guidance system. By following the digital counter one can measure the fishing line from the tippet, leader, shooting head, casting line and backing all of which a fisherman needs to know.

BRIEF DESCRIPTION OF THE DRAWINGS

FIG. 3A, provides an overview of the present invention and its various components.

DETAILED DESCRIPTION

Dryer Section

Figure 1:
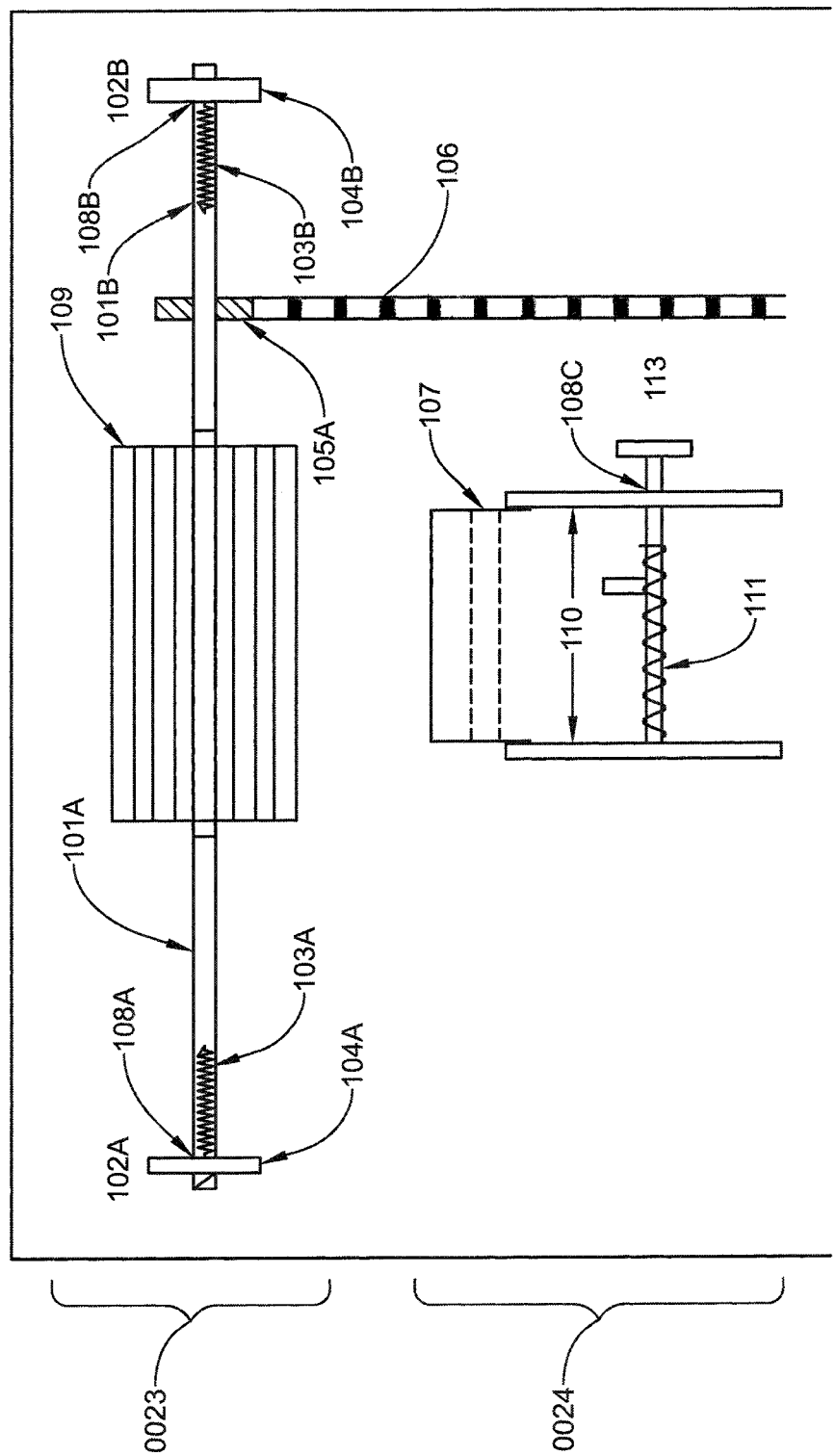
FIGS. 1 and 2 schematically illustrate a topside view of an alternating current electronic fishing line spooler, unspooler, cleaner, tensioner, dryer, conditioner, line counter and re-spooler.
Figure 2:
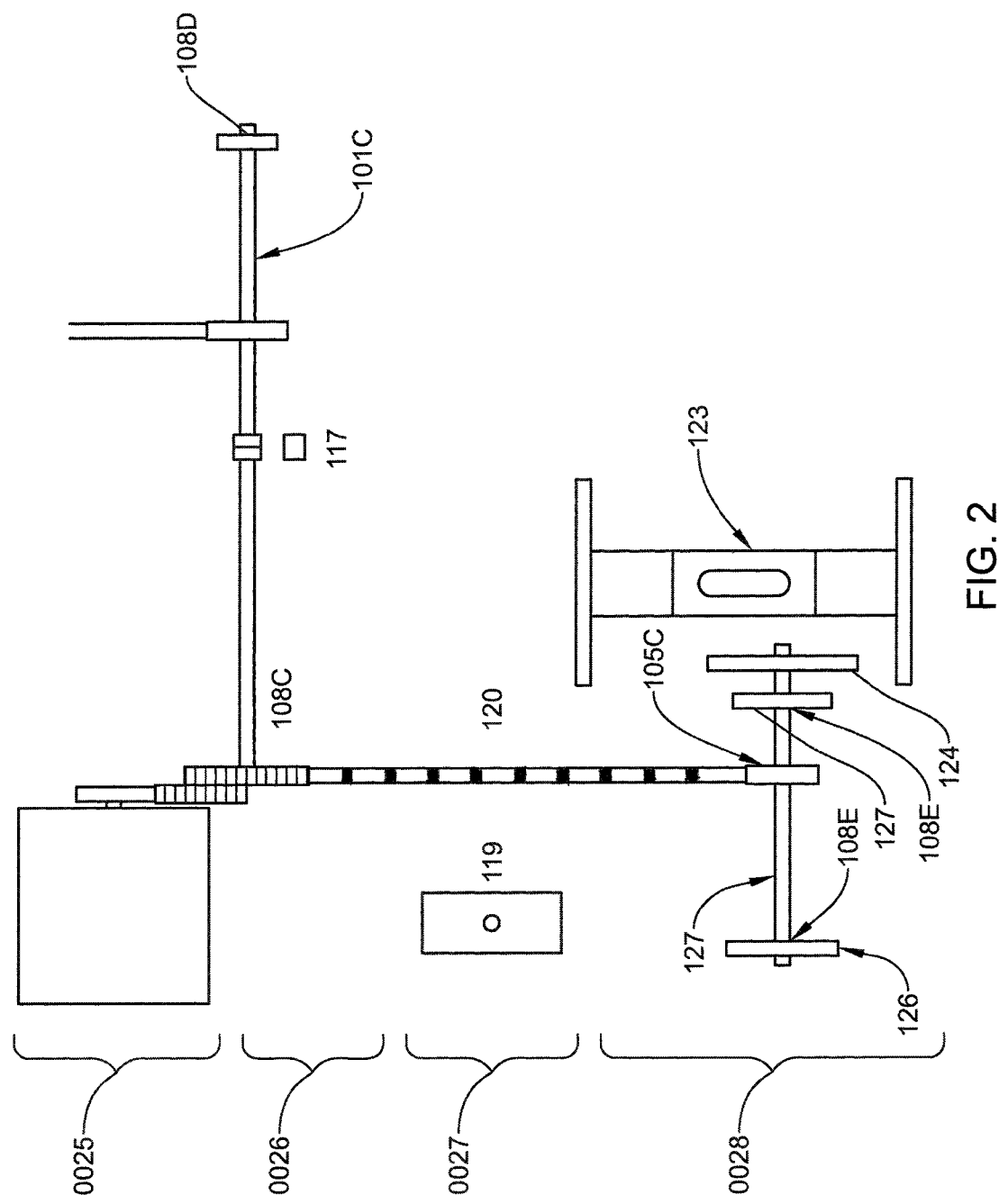
Figure 3:
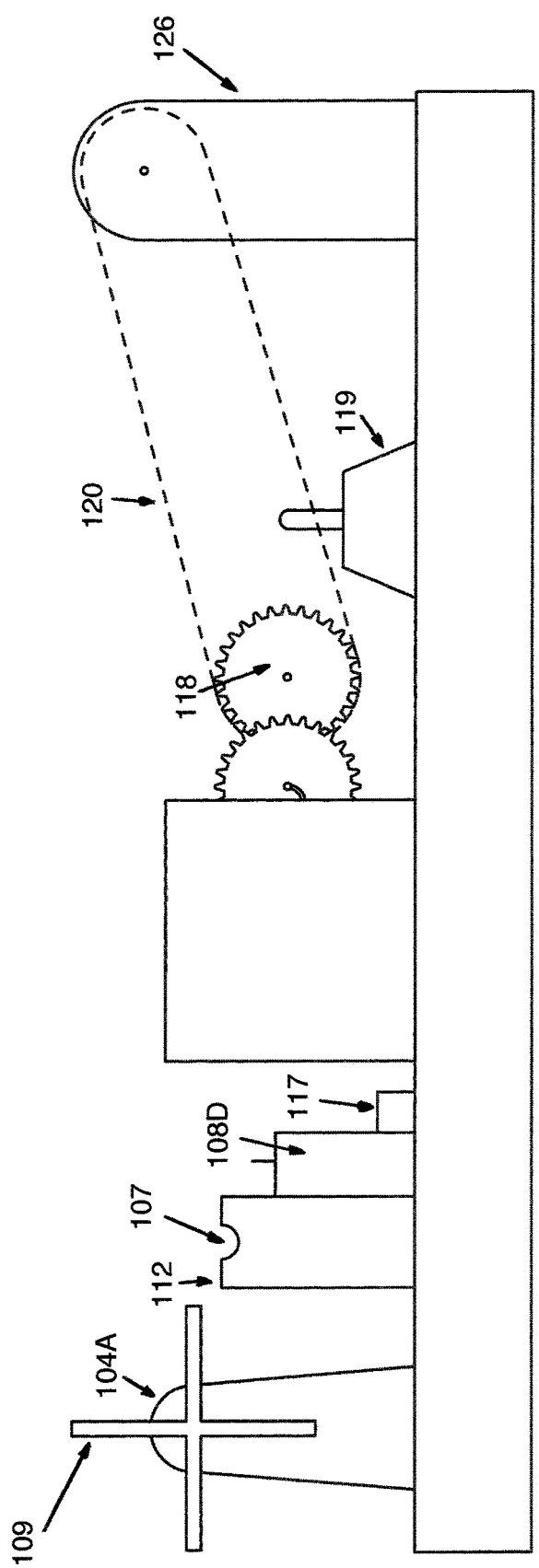
FIG. 3 is a side-view of the above invention.

A ¼" diameter threaded rod is used as an axle indicated as 101A and 101B. The length is 13". The ends of the axle are capped with ¼" nuts to keep it centered as shown 102A and 102B. A spiral spring shown as 103A and 103B is capped by-double nuts, which adjust pressure on brackets 104A and 104B. The spring exerts pressure, which prevents the dryer 109 from rotating out of control. Thus the fishing line has a firm pressure winding or unwinding. Brackets 104A and 104B are wood 3¼" high by 2¼" wide. Inside each bracket is a roller bearing so the axle rotates easily. The bearings are listed 108A through 108F. The drying basket is number 109. It is 4" wide and has crossed wood sides as seen on FIG. 1. The spindles are plastic ¼" diameter plastic chopsticks. The drying basket can be made of plastic or wood chopsticks. A metal can inhibits the drying so it was discarded. On the inside and outside of the basket it has a double ¼" nut to prevent slippage.

Pulleys 105A, 105B and 105C are 1½" in diameter, with a ¼" shaft, two Allen locking screws each, ¼" wide belt. Each has a locking nut to prevent slippage. This completes the explanation of the dryer portion. The rubber belt 106 connecting the dryer shaft to the motor is 5/16" wide and 9¼" long. It has six traction spokes per inch.

Cleaner and Line Conditioner with Line Counter

A wooden block is identified as 107. It is 3" wide, 3¼" high and 1½" thick. A horizontal trough ¼" deep, ¼" wide and 2" long was cut in the top. Next a felt strip is attached to block with upholstery thumbtacks on either side. Either clean water or line conditioner is poured into the trough depending on what is needed to treat or clean the line. Then another piece of thick felt is placed over the block. The fly line is seated and a rubber band holds the felt down. Turn the machine on and the line is either cleaned or treated depending on which way the line is traveling and the liquid saturating the felt. The stands holding the line directional worm gear are made of wood ½" thick, 2¼" wide and 3¼" high. The base is ½" thick, 2¼" side and 3¼" across, #110. Next item, 111 is a horizontal worm gear 3" across with a cogwheel, which traverses left to right and right to left as it rotates driven by a 2" pulley #113. As the line traverses being wound on the dryer, it disperses the line on the dryer in the same formation. Thus the line is cleaned all the way across the cleaning block at station 107.

When the entire operation is reversed the line is treated all the way across the treating block at station 107. As the line traverses left to right and right to left, it is distributed on a reel in the same manner of station 112, FIG. 1. The cleaning, line conditioner is driven by #113, a pulley. An elastic band serves as a belt to the double pulleys. Both are 1" pulleys double nutted to prevent slippage. Also an elastic band 115 serves as a belt to drive the line counter #117. This completes the section "Cleaner and Line Conditioner and Line Counter" of this project.

Motor Section

This part of the project has changed a dozen times. Since I live in Silicon Valley, inexpensive direct current motors are readily available. However if a knot in the line or for any reason the machine jams, the motor explodes. I will revisit this issue as soon as I locate a stress switch or excessive electrical load switch, which will shut down the machine immediately. The motor explodes before one can react and flip the off switch. A direct drive motor will enable this machine to be portable. Just plug it into an automobile cigarette lighter. Now, with an inverter, direct current to alternating current and it is portable. At this juncture a 120V 60 HZ 90 RPM alternating current motor is the best choice. If a knot or something jams the machine it does not explode and one has plenty of time to switch the power off. Attached to the drive shaft of the motor is a plastic pulley 1¼" diameter. It meshes with a 1½" diameter metal gear. A like metal gear is mounted side by side the first gear. This entire sequence of gears acts as a clutch because it will slip if the machine jams. The second gear (108C) also drives a belt (120) when the machine is re-spooling the line on a reel. The belt is ⁵⁄₁₆" wide and 8" long with six traction spikes per inch. The outer shaft is ¾".

Drive Section

The drive axle is a ¼" diameter rod and 10¾" long. The wood supports for the axle are labeled #118 and #116. The wood supports are 1¼" high, 3¼" wide and ¾" thick. Inside each are ball bearings, Numbers 108C and 108D. The shaft is double nutted on each side of the supports so it cannot shift. The belt described earlier, #106, is driven by pulley #105B, and also described earlier. Pulley #117 was also described earlier.

Switch Section

At present the switch is wired for 120V alternating current as indicated by item #119 on FIG. 1. However it can be rewired as a double pole direct current switch.

Reel Section

Again the axle item #127 is ¼" rod and 6" length. The wooden supports number #126 and #124 are 3¼" high by 2¼" wide and ¼" thick. Inside are roller bearings. The axle is double nutted on each side of the supports and the gear, #105C, which prevents slippage. The drive gear, 105C, has been described earlier. Wooden blocks 2½" by 4" and ½" thick are used to adjust the height of the reel section. Since reels have several types of handles and are spaced differently, the height of the axle driving the rotary spindle, item #124, must be adjustable. So must the spindle engaging the handle. The first spindle was made from a bathroom fan. It is 4" high with a ¼" hole in the center and a ¼"×1" oval cut in the side. It drives a small fly reel. A plastic coffee can lid was utilized for the new larger reels. The lid is 6" in diameter, has a hole in the center for the drive axle and ½"×½" oval cut in the side to envelope the crank handle. Others fit both the spinning reels and also casting reels. In short a spindle can be made to turn any size or shape reel made.

Rod Holder

Cut off any old rod or purchase a reel seat from a manufacture and mount it in line with the cleaner, line treater and drying cage. It will secure any type of reel. The mounting blocks are 2" high by 3" wide and ¾" thick. One inch diameter centered holes are drilled in each block and a rod handle glued in place, item #123.

Platform

Wood as used as a platform but plastic or metal would also work. The platform is 13" wide by 19½" long and 1" thick. All stands supporting the axles could easily be adjusted by moving the screws below and drilled through the platform.

A Note

The ideal time to wipe clean and oil a reel would be following the line being transferred to the dryer.

Tests One Through Twenty Five

Test One

Frank Selzi, my deceased friend, neighbor, WWII hero and fellow fisherman was adamant to place one's fishing line and reel in a bucket to clean it after fishing. The line had to be dried and the reel taken apart, cleaned oiled and reassembled. To dry the line, it was wound around all the trees, pots, tables, and lawn furniture. Then it was cleaned using a line cleaner and rewound on a reel. This procedure required hours and sometimes days.

Test Two

After several years of winding fishing lines around trees and chairs I developed a fishing line dryer. To dry the line, a tall juice can was used to wind the line around.

The perforated can retained water so the line required a lot of time to dry. Thus a cage of dowels was made so the line would dry. It worked. The line dried.

To unload the line from a reel it had to be held in line with the cage.

Next a crank was added to the end of the cage to facilitate winding the line on the dryer.

Test Three

A 1" thick piece of plywood was used to screw the drying cylinder in place. Thus the reel could be attached to the board instead of being held.

However one had to guide the line on the drying cage and also back on the reel.

Test Four

Since the drying cylinder was firmly in place one could turn the handle and wind a fishing line on the cylinder.

However, the fly reel had to be held in the other hand.

Thus, if the 1" thick board could hold the cylinder, it could also hold the reel.

An old rod handle was used to hold the reel.

This idea worked but was too slow and the line often tangled without a drag to resist spinning.

Test Five

The same design was used as in test four, however springs were compressed on either side at the drying cylinder to stop the over spin.

Test Six

Extended the ¼" rod thru the cylinder outside the mounting brackets and attached a drill to spin the rod and cylinder.

Result the drill continually fell off and rounded the rod threads.

Also it only traveled one way.

Test Seven

Using the same apparatus as in test six, but added a rubber cylinder to spin the reel arbor. This idea worked. However the drill continually worked loose and the wheel skipped while spiraling the reel.

Test Eight Through Fourteen

After using the drill cleaning method a multitude of times, it dawned on me to use just the motor.

Several motors were purchased from the computer outlet store.

A six-volt, twelve volt and eighteen-volt motors were tried. A friend, Bob Manniello, helped me to wire the direct current motors so a switch could be used to reverse direction.

One reversible direct current motor could be attached via belts to the dryer and rewinder of the reel.

Perfect! However when a knot on the fly line became entangled the machine would explode. Many voltages and transformers were tried. All actually exploded.

If a stress switch could be made to switch off the machine when it jammed, then it wouldn't explode. They do not make one that I know of.

The attached drawing shows the configuration.

Tests Fifteen, Sixteen and Seventeen

An electric motor driven by alternating current does not explode if the machine jams; thus a breakthrough!

Next the rubber tire slipped too much while spiraling the spinning reel.

Several chucks were made out of plastic pipe material but were unsatisfactory. Then Jim Concil gave me a bathroom fan. I used the plastic backing and removed all the blades.

Next I cut a hole in the back and inserted the handle of the reel. It works!

Now it was possible to wind the fly line on the dryer and then rewind the fly line on the fly reels.

However the machine operator must guide the fly line back and forth to separate the line on the reels.

Tests Eighteen Through Twenty

Jim Consul loaned me a trolling reel which had a worm gear which ran the line to and fro.

I obtained pulleys from a hobby shop and used a rubber band to drive the worm gear.

The throw was not quite wide enough. The line bunched on both spools.

I went to Ernie Kinzil in Soquel, Calif. at Ernie's Casting Pond for advice on where to obtain reel parts. He directed me to Ollie Damon's in Portland Oreg. He sent a worm gear that was 1¼" wide. We communicated by phone on Mar. 4, 2009 and Apr. 6, 2009. After many attempts at mounting the worm gear at different distances I phoned Ollie again and requested a wider worm gear and cog wheel that would not flip over and jam and a cog wheel.

Tests Twenty Through Twenty Five

All components, drying drum, motor, switch, rod mount, reel mount axel were rearranged on the 1" thick plywood so the worm gear would spread the line to either the drying drum or the reel.

Next a felt cleaner was placed between the worm gear and dryer. Now the fly-fishing line could be cleaned as it is spun on the drying drum and coated with line dressing when reversed to the reel.

It works!

After obtaining a patent I will offer a spinning and casting mount to handle every type of reel.

The motor belts and mounts can be changed but all the essentials will work as per my working model.

In conclusion the premise of this invention is based on the need to clean, dry and treat fishing line after use which is drudgery, whether you catch fish or not. But that is another story for another day!

NOTE: From test eight thru twenty five, the tests varied by spacing the units differently, changing the size pulleys or belts, size motors, gears and AC or DC. See attached.

What I claim:
1. A fishing line cleaner, dryer, conditioner and spooler tool comprising:
 a. a base;
 b. an electric motor supported on the base for unwinding and winding said fishing line having means to turn said motor on and off;
 d. a rod holder mounted in operative relation for transferring line to and from a fishing reel, said rod holder coupled to said motor;
 e. a worm gear to guide fishing line from right to left winding said fishing line on a dryer cage and left to right when unwinding onto said fishing reel;
 f. a cleaning block having a top surface and bottom surface, said bottom surface mounted on the base, said top surface coming in contact with an absorbent and/or abrasive pad, said cleaning block having a predetermined height and thickness;
 g. a rotating dryer cage supported on the base, for pulling said fishing line through said cleaning block;
 wherein, the motor may be of an AC or DC variety, said rod holder is coupled to said motor with a belt, winding and rewinding said fishing line is accomplished using belts to change direction of rotation of said drying cage, when motor is turned on the fishing line is threaded through said worm gear which dispenses said fishing line right to left and left to right as it moves through the cleaning block and winds on the dryer cage, causing wet fishing line to dry on dryer cage and tension said fishing line, preventing said dryer cage to over spin, reversing direction of rotation by changing belts causes the fishing line to unwind from dryer cage and rewind on said rod holder and tension said fishing line.

2. The tool of claim 1 wherein direction of rotation of said drying cage is reversed and said absorbent and/or abrasive pad having coated with line preservative to condition fishing line and maintaining fishing line tension and wrapping said fishing line onto said rod holder from left to right and right to left.

3. The tool of claim 1 wherein said fishing line is threaded through said worm gear and dispersed left to right and right to left as it moves through said absorbent and/or abrasive pad and wrapped on said rotating dryer cage causing said fishing line to dry.

4. The tool of claim 1 wherein said cleaning block top surface is coated with line cleaner removing impurities present on the said fishing line.

5. The tool of claim 3 wherein said dryer cage tensions the fishing line as said fishing line is rewinding back on said fishing reel.

6. The tool of claim 1 further comprising a line counter attaching to said worm gear measuring length of said fishing line.

\* \* \* \* \*